United States Patent

[11] 3,617,065

[72] Inventor Marvin Camras
Glencoe, Ill.
[21] Appl. No. 793,352
[22] Filed Jan. 23, 1969
[45] Patented Nov. 2, 1971
[73] Assignee IIT Research Institute
Chicago, Ill.

[54] CARTRIDGE TRANSDUCER MACHINE AND CARTRIDGE THEREFOR
5 Claims, 6 Drawing Figs.

[52] U.S. Cl. .......... 274/4 B, 179/100.2 Z
[51] Int. Cl. .......... G11b 5/00
[50] Field of Search .......... 274/4 BC, 1 BC; 179/100.2 Z; 242/55.13, 55.19 A

[56] References Cited

UNITED STATES PATENTS

| | | | |
|---|---|---|---|
| 3,485,500 | 12/1969 | Loeschner .......... | 274/11 B |
| 3,492,005 | 1/1970 | Ueno .......... | 274/4 B |
| 2,572,596 | 10/1951 | Camras .......... | 242/55.13 |
| 3,009,024 | 11/1961 | Eash .......... | 179/100.2 |
| 3,385,534 | 5/1968 | Staar .......... | 242/55.13 |
| 3,437,762 | 4/1969 | Lear et al .......... | 179/100.2 |

*Primary Examiner*—Leonard Forman
*Assistant Examiner*—Dennis A. Dearing
*Attorney*—Hill, Sherman, Meroni, Gross & Simpson

ABSTRACT: A tape cartridge transducer machine compatible with existing tape cartridges but provided with a cartridge ejection leverage mechanism which is actuated manually or by a solenoid to overcome the cartridge biasing spring and shift the cartridge to an inactive standby position in the cartridge receiving space of the machine, after which the cartridge is manually removable with minimum effort. The machine preferably provides a balanced cartridge-biasing means to safeguard the cartridge against binding.

INVENTOR
Marvin Camras
BY Hill, Sherman, Meroni, Gross & Simpson
ATTORNEYS

CARTRIDGE TRANSDUCER MACHINE AND CARTRIDGE THEREFOR

SUMMARY OF THE INVENTION

This invention relates to a tape cartridge transducer machine and particularly to such a machine which is capable of accepting the present commercially available prerecorded eight-track endless loop magnetic tape cartridges.

It is an important object of the present invention to provide a tape cartridge transducer machine providing extreme ease and convenience in shifting a tape cartridge from the operating position to an inactive standby position in the machine.

It is another object of the present invention to provide a tape transducer machine providing for the removal of a tape cartridge from the operating position with a minimum of attention, this being an important safety feature when the machine is installed in an automotive vehicle for operation by the driver of the vehicle.

It is another object of the present invention to provide a tape cartridge transducer machine which is capable of reliable operation with existing commercially available endless loop magnetic tape cartridges.

A further object of the invention is to provide a tape cartridge transducer machine having a substantially more reliable cartridge biasing mechanism which safeguards the cartridge against binding.

Another and further object of the present invention is to provide a simple and reliable tape cartridge transducer machine capable of economical mass production.

Still another object of the invention to provide a tape cartridge transducer machine capable of automatically shifting a cartridge to a standby position at a desired point in a transducing operation.

Other objects, features and advantages of the present invention will be apparent from the following detailed description taken in connection with the accompanying drawings.

DESCRIPTION OF THE PREFERRED EMBODIMENTS

Figures 1, 2, 3, 4, 5, 6:
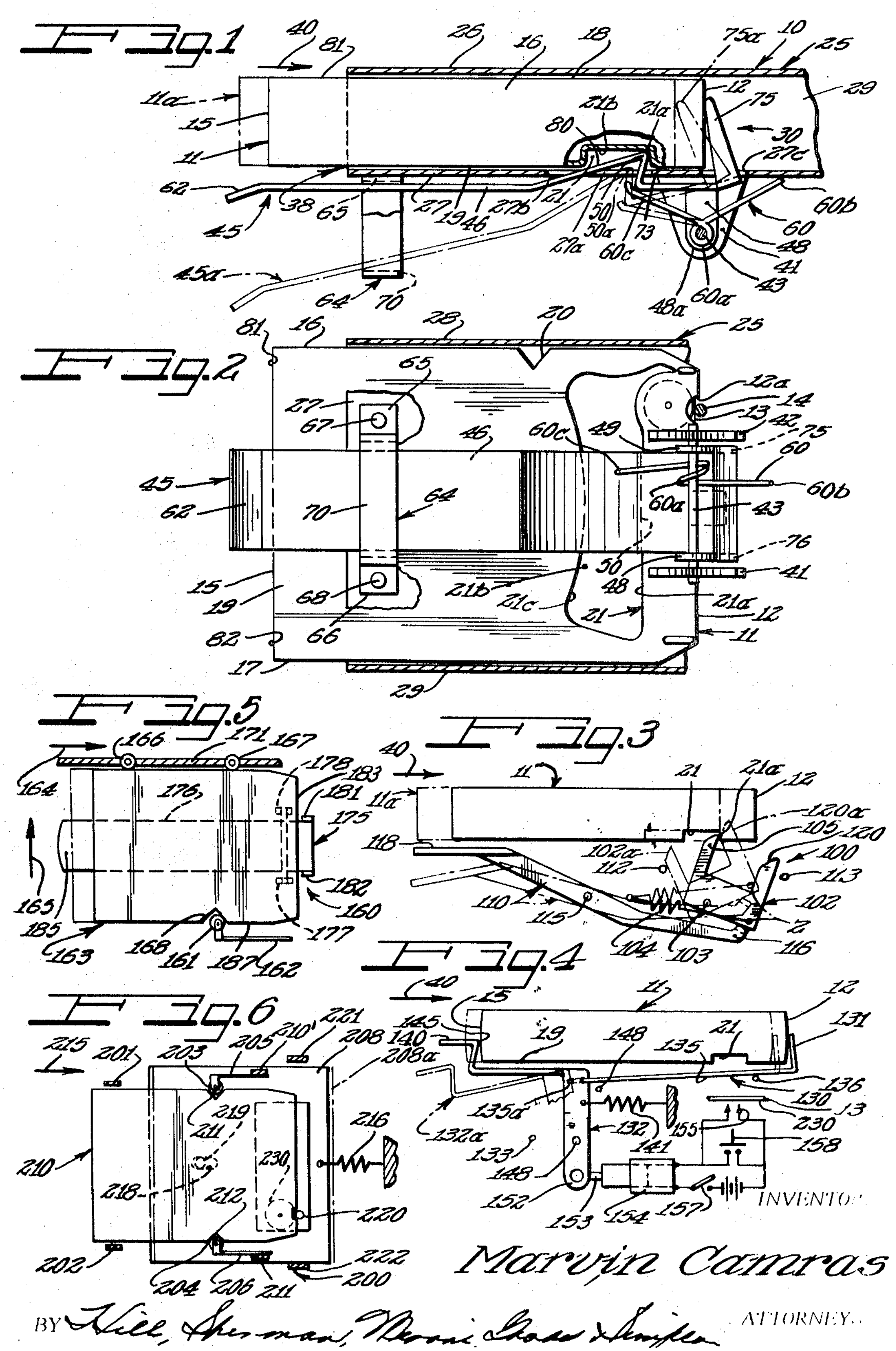
FIG. 1 is a somewhat diagrammatic vertical sectional view of a tape cartridge transducer machine in accordance with the present invention with certain parts omitted for clarity and showing in solid outline an operating position of a magnetic tape cartridge, and showing in dot-dash outline an inactive standby position of the cartridge.
FIG. 2 is a somewhat diagrammatic bottom plan view of the machine of FIG. 1.
FIG. 3 is a somewhat diagrammatic side elevational view of certain portions of another embodiment of tape cartridge transducer machine in accordance with the present invention.
FIG. 4 is a somewhat diagrammatic side elevational view of portions of a third embodiment of tape cartridge transducer machine in accordance with the present invention.
FIG. 5 is a somewhat diagrammatic top plan view of a further form of tape cartridge transducer machine in accordance with the present invention, the cartridge ejection mechanism being similar to that illustrated in FIGS. 1 and 2.
FIG. 6 is a somewhat diagrammatic top plan view of a further form of tape cartridge transducer machine in accordance with the present invention and to which any of the cartridge ejection mechanisms of FIGS. 1–5 may be applied.

Referring to FIGS. 1 and 2, there is illustrated a tape cartridge transducer machine 10 adapted for transducing operation with a conventional endless loop magnetic tape cartridge 11 of standard configuration. Such cartridges are currently widely available with eight-track stereo sound prerecorded thereon. The standard cartridge includes a front wall 12 having a plurality of apertures such as the aperture indicated at 12*a* in FIG. 2 for exposing the prerecorded magnetic tape 13, FIGS. 2, for operative engagement with certain components of the transducer machine such as capstan 14 and magnetic transducer heads and control contacts (not shown). The cartridge further comprises a rear wall 15, sidewalls 16 and 17, a top wall 18 and a bottom wall 19. As seen in FIG. 2, sidewall 16 is provided with a notch 20, and the bottom wall 19 is provided with a recessed portion 21 having a forward wall 21*a* and an offset bottom wall portion 21*b*. Since the cartridge is of standard construction, well known in the art, further description thereof is deemed unnecessary.

Referring to FIG. 1, the transducer machine includes a housing 25 having an upper wall 26, a lower wall 27 and respective sidewalls 28 and 29 defining a cartridge-receiving space 30. The transducer machine except as hereinafter specifically pointed out may conform to any present commercial tape cartridge player machines utilized for reproducing music recorded on the magnetic tape of the cartridges such as indicated at 11. The portions added by the present invention as shown in FIGS. 1 and 2 have actually been added to a conventional machine and are so designed as to involve a minimum alteration of such machines. The lateral guide rollers which are present in existing machines at locations along wall 29 are preferably omitted in the machine of FIGS. 1 and 2.

The cartridge-receiving space is provided with an open end as indicated at 38, FIG. 1, so as to provide an entrance for insertion of the cartridge 11. The cartridge is moved in a loading direction as indicated by arrow 40 progressively along a loading path to an operating position as shown in solid outline in FIGS. 1 and 2 wherein the magnetic tape 13 is operatively associated with the elements such as capstan 14 of the transducer machine 10. FIG. 1 is somewhat diagrammatic in illustrating the vertical dimension of the cartridge-receiving space, and it will be understood that the dimensions and configuration of the cartridge-receiving space will essentially be conformed to that in present commercial player machines for this type of cartridge.

In accordance with the present invention, the transducer machine 10 is provided with a pair of depending lugs 41 and 42 having a pivot shaft 43 for pivotally mounting a leverage mechanism 45. In the illustrated embodiment, the leverage mechanism 45 comprises a lever 46 of sheet metal construction and extending generally along the cartridge-loading path. The lever 46 is provided with integral leg portions 48 and 49 having lower offset pivot portions such as indicated at 48*a*, FIG. 1, with circular apertures receiving the pivot shaft 43 so as to mount the lever 46 for pivotal movement about the axis of shaft 43.

The lever 46 is further provided with a cartridge-engaging portion 50 for engaging with wall 21*a* of the recess 21 which is conventionally provided in the cartridge 11. It will be observed that the pivot portions such as 48*a* are substantially offset away from the cartridge-receiving space 30 and that the cartridge-engaging portion 50 lies along a radial line from the axis of pivot shaft 43 which forms an angle of about 45° or less to the vertical so that as the cartridge-engaging portion 50 moves about the pivot axis from the position shown in solid outline in FIG. 1, a substantial component of movement will be in the direction indicated by arrow 40, and in fact the horizontal component of motion will exceed the vertical component of motion of the cartridge-engaging portion 50. A wire-biasing spring is indicated at 60 having an intermediate portion 60*a* encircling shaft 43, having one end 60*b* engaging the underside of lower wall 27, and an opposite end 60*c*, engaging the lever 46 and biasing the same in the clockwise direction about the axis of pivot shaft 43. Thus, lever 46 when in the cartride-biasing condition illustrated in FIG. 1, has its cartridge-engaging portion 50 urged against the wall 21*a* of the cartridge so as to bias the cartridge in the loading direction as indicated by arrow 40. The actual relative dimensions of the lever 46 and of the cartridge-receiving space, and of the aperture 27*a*, FIG. 1, through which the lever projects into the cartridge-receiving space, are such that the lever cannot engage the top wall or offset wall 21*b* defining recess 21, so that the only effective component of force exerted by the lever 46 on the cartridge is essentially in the loading direction indicated by arrow 40. Further, there are sufficient clearances between the lever 46 and the edge 27*b* of aperture 27*a* that the lever will not have reached its extreme clockwise position while in engagement with a cartridge, regardless of any tolerances in the manufacture of the cartridges or of the transducer machine.

In order to release the cartridge from the cartridge retention means including the cartridge-engaging portion 50, the lever 46 is provided at its rear end 62 with a manually engageable portion which may be depressed by the fingers of the operator so as to pivot the lever to the cartridge release condition indicated in dot-dash dash outline at 45*a*. A bracket is indicated at 64 having flanges at 65 and 66 secured to the underside of the wall 27 by fastening means 67 and 68. The central portion 70 of the bracket is offset from the cartridge-engaging position of the lever by a distance sufficient to accommodate shifting of the cartridge-engaging portion 50 out of cartridge-blocking condition relative to cartridge 11 so as to enable shifting of the cartridge to the inactive standby position indicated at 11*a*. As indicated in dot-dash outline at 73*a*, a portion 73 of cartridge 11 is shifted into overlying relation to portion 50 of the lever 46 in the standby position of the cartridge, the release position of the portion 50 being indicated in dot-dash outline at 50*a*. Thus, when the lever 46 is released, spring 60 will return the lever slightly to a position with the portion 50*a* in engagement with the external wall portion 73*a* of the cartridge, holding the lever 46 effectively in a cartridge release condition such that the cartridge 11 can be manually removed from the cartridge-receiving space by grasping the rearwardly projecting end portion of the cartridge. The force required to remove the cartridge from the standby position 11*a* is thus substantially less than that required to manually directly remove the cartridge from the operating position, and in the illustrated embodiment, the force required to remove the cartridge from the machine when the cartridge has been shifted to the inactive standby position is substantially negligible.

In the illustrated embodiment, the cartridge 11 is automatically moved from the operating to the standby position as the cartridge retention means 50 is moved to the cartridge-releasing condition. To this end, the forward end of the lever 46 is provided with upstanding finger portions 75 and 76 for engagement with the front wall 12 of the cartridge 11 during pivotal movement of the lever 46 from its cartridge-retaining condition to its cartridge release condition as illustrated in FIG. 1. Specifically, in the cartridge release condition of the lever 46 as indicated at 45*a*, the fingers assume a position as indicated at 75*a* in FIG. 1. Thus, the body portion 70 of bracket 64 provides a limit for downward movement of the lever of 46 so as to define an inactive standby position of the cartridge as indicated at 11*a* wherein the cartridge is maintained by the housing 25 in a stable condition. Further, in the stable standby position, the portion 50 of the lever 46 engages the bottom wall 19 of the cartridge at a region 73 so as to maintain the lever 46 in a cartridge release condition accommodating convenient removal of the cartridge from the housing with substantially a minimum or negligible effort.

With a cartridge completely removed from the cartridge-receiving space 30, spring 60 will urge the lever 46 to its extreme clockwise position, which is slightly beyond the cartridge-retaining position indicated in FIG. 1. By way of example, edge 27*b* defining aperture 27*a* may provide a limit to the clockwise pivoting movement of the lever 26 about the axis of shaft 43. Then, when the cartridge 11 is inserted into the housing 25, the leading edge of the cartridge will engage a sloping portion 80 of the lever 46, readily forcing the lever in the counterclockwise direction, substantially to the cartridge-releasing condition indicated at 45*a*. As the cartridge is moved from the position indicated at 11*a* to the position indicated at 11, the cartridge-engaging portion 50 moves into the recess 21 under the impetus of the spring 60, allowing the lever 46 to assume its cartridge-biasing condition as illustrated in solid outline in FIG. 1. The movement of the fingers 75 and 76 is conjoint with the movement of the cartridge engaging portion 50 so as to accommodate the progressive inward movement of the cartridge 15 to the operating position shown in solid outline in FIG. 1.

It will be understood that in the preferred embodiment, parallel longitudinally extending ribs 81 and 82, FIG. 2, on the conventional cartridge extend in close relation to the interior face of the upper wall 26 in the operating position of the cartridge, and that the amount of tolerance and clearance in the vertical direction between the cartridge and the cartridge-receiving space is within the acceptable limit for scanning of the recorded tracks by the playback head and for capstan roll alignment.

As illustrated in FIG. 2, the sidewalls 28 and 29 of the housing 25 may be in relatively close relationship to the sidewalls 16 and 17 of the cartridge, and the guide rollers of the conventional player machine may be omitted since there are no strong frictional forces against sidewall 29 which restrict the forward motion as in the conventional arrangement. An aperture 27*c*, FIG. 1, is shown in wall 27 accommodating the range of movement previously described for lever 46. Fingers 75, 76 may have sufficient clearance from wall 12 of the cartridge to avoid binding contact, or may be sufficiently resilient to accommodate a slight flexing thereof during ejection of a cartridge, since the fingers 75, 76 have a greater horizontal component of motion than the cartridge-engaging portion 50. Lever 46 may have side flanges for stiffness.

FIG. 3 shows diagrammatically a second type of transducer machine 100 for operation with the conventional cartridge 11. In this embodiment, a toggle element 102 is pivotally mounted at 103 and is provided with a tension spring 104 serving to maintain the toggle element 102 either in the cartridge-biasing condition shown in solid outline or in the cartridge-releasing condition indicated in dot-dash outline at 102*a*. In the cartridge-biasing condition, a cartridge-engaging portion 105 engages wall 21*a* of the cartridge recess 21 to urge the cartridge in the forward loading direction as indicated by arrow 40. The portions of the housing of the machine 100 other than the toggle element 102 and the actuating lever 110 may correspond substantially to those illustrated in FIG. 1 and FIG. 2. It will be noted however, that the slot corresponding to slots 27*a* and 27*c* in FIG. 1 will have slightly different configuration so as to accommodate movement of the toggle element 102 between its cartridge-releasing condition against stop 112, and its extreme clockwise position against stop 113. The lever 110 is shown as being pivoted at 115 and as having a forward end 116 for engagement with the toggle element 102 and shifting thereof over center so that the spring 104 can move the toggle element to its extreme counterclockwise position. The lever 110 can be provided with a relatively broad flat manually engageable portion 118 arranged adjacent the entrance of the cartridge-receiving space as illustrated for the portion 62 in FIGS. 1 and 2. By way of example, the weight distribution of the lever 110 may be such as to bias the same counterclockwise about the pivot 115.

In operation, when it is desired to shift a cartridge to the standby position indicated at 11*a* in FIG. 3, the portion 118 of lever 110 is manually depressed driving the toggle element 102 over center, whereupon the action of spring 104 drives the toggle 102 to its extreme counterclockwise direction, finger 120 of the toggle element 102 engaging the front wall 12 of the cartridge and forcing it to the standby or inactive position 11*a*. In this position, the cartridge 11 is stably held by the housing of the transducer machine 100, and the spring 104 holds the toggle element 102 in its stable cartridge release condition. From this position of the cartridge, there is substantially no resistance to manual removaL of the cartridge from the machine.

In loading a new cartridge into the machine, the forward end 12 of the cartridge will engage the leg 120 which is disposed in the position shown at 120*a* in dot-dash outline. Progressive movement of the cartridge from the inactive to the operating position will shift the toggle element 102 overcenter, whereupon the spring 104 will move the cartridge-engaging portion 105 into biasing engagement with the wall 21a of the cartridge urging the cartridge in the loading direction 40 and holding the cartridge resiliently in the operating position.

In FIG. 4, there is shown a tape cartridge transducer machine 130 which is also operable with the standard tape cartridge 11. The housing for receiving the cartridge may have essentially the configuration of the housing of FIGS. 1 and 2 except that the slot corresponding to the slot 27c in FIG. 1 may have a configuration to accommodate movement of the cartridge ejection finger 131 between the solid outline position shown in FIG. 4, and a second position corresponding to engagement of the lever 132 with stop 133. The cartridge ejection finger 131 may be formed as an upturned end portion of an elongated wire 135 which is fixed at its forward end 135a to lever arm 132. The wire 135 may be provided with a guide pin 136 for insuring that the ejection finger 131 maintains proper engagement with the cartridge 11 during movement of the cartridge to the standby or inactive position (not shown). The cartridge 11 is moved to the standby position by engaging manually engageable portion 140 of lever 132 and depressing the same until the lever 132 engages its limit stop 133. Thereupon, release of the portion 140 allows tension spring 141 to return the lever arm approximately to the position indicated in dot-dash outline at 132a in FIG. 4. In this position, a cartridge-engaging portion 145 of lever 132 is engaged with the bottom wall 19 of cartridge 11 so as to maintain the lever 132 in the cartridge-releasing condition. The cartridge may thereupon be removed with substantially negligible resistance exerted by the cartridge retention lever 132. Any tendency of the portion 145 of the lever 132 to engage in recess 21 may be minimized by curving the lever in vicinity of the cartridge-engaging portion 145 so as to have a curvature opposite to the curvature of wall 21c, FIG. 2.

When the cartridge is completely removed from the receiving space, spring 141 will urge the lever 132 in the clockwise direction as limited by stop 148.

When inserting a new cartridge into the machine 130, the front wall 12 of the cartridge is utilized to depress the manually engageable portion 140 of the lever as the cartridge is inserted into the loading space. As the cartridge is moved from the standby (not shown) to the operating position shown in solid outline in FIG. 4, spring 141 pivots the lever 132 in clockwise direction about pivot shaft 148 to move the cartridge-engaging portion 145 into biasing engagement with the rear wall 15 of the cartridge so as to resiliently urge the cartridge in the loading direction indicated by arrow 40. To release the lever from the cartridge-retaining position the portion 140 is manually depressed rotating the lever 132 counterclockwise about shaft 148 to its extreme position defined by stop 133, the cartridge ejection finger 131 moving the cartridge to the standby or inactive position.

An important feature which may be applied to any of the embodiments is to provide for automatic actuation of the cartridge ejection mechanism by driving the leverage mechanism such as 132 to its cartridge release condition. In FIG. 4 this is accomplished by providing an extension 152 on lever 132 which is coupled to an armature 153 of a solenoid 154. The solenoid has an energizing circuit which includes, for example, contacts 155 which are bridged by a conductive element on the tape, for example, when the transducer head finishes scanning of the last pair of tracks recorded on the tape. Simply by way of example, the contacts 155 may be shiftable with the magnetic transducer head relative to the tracks on the magnetic tape so that the contacts 155 scan successive tracks on the tape, and thus may be actuated by a bridging strip arranged on the last scan of the tracks scanned by the contacts 155. Many other suitable arrangements could be provided for causing the cartridge to be shifted to the standby condition at a predetermined point in the scanning of the prerecorded tape in the cartridge. A disabling switch is indicated at 157 which may be selectively actuated to the open condition by the user to allow continuous and repeated play of the selections recorded on the tape. As a further embodiment, a manually operable pushbutton switch 158 may be provided in parallel with the contacts 155 so as to allow the user to initiate mechanical shifting of the cartridge to the standby position at any time. The pushbutton switch 158, could, of course be located remotely from the transducer machine at any suitable convenient location. Such a feature is of particular importance for safety reasons where the transducer machine is utilized in an automobile and is to be operated by the driver of the automobile while the automobile is in motion.

Referring to FIG. 5, a transducer machine 160 is illustrated utilizing a conventional detent roller 161 on a spring arm 162 for biasing a cartridge 163 both in the forward loading direction 164 and in the lateral direction indicated by arrow 165. Suitable guide rollers are indicated at 166 and 167 for acting on cartridge wall 171 so as to accommodate the forward biasing movement of the cartridge into the operating position. The cartridge 163 may be identical to the conventional cartridge and include a notch 168 with the detent roller 161 cooperates as in a conventional player.

A cartridge release mechanism 175 for the machine of FIG. 5 comprises a lever 176 essentially corresponding to the ejection portion of the lever 46 of FIGS. 1 and 2. Thus the lever is provided with offset pivot portions as indicated at 177 and 178 and is provided with upwardly extending finger portions 181 and 182 for engaging a forward wall 183 of cartridge 163 when the rear portion 185 of the lever is depressed to an extreme lower position as determined by a suitable stop such as that indicated at 70 in FIG. 1. The travel of the ejection fingers 181 and 182 is sufficient to move the cartridge 163 to a stable standby condition wherein the detent roller 161 acts on a flat or slightly grooved portion 187 of a sidewall of cartridge 163 which is offset from the extent of notch 168. The cartridge retention means 161 provides a substantially negligible or minimum resistance to removal of the cartridge from the machine once the cartridge has been moved to the standby or inactive position. The cartridge ejection mechanism 175 may have its center of mass such that it normally assumes an extreme cartridge ejecting position such as that indicated at 45a in FIG. 1. As a cartridge is inserted into the machine, the forward wall of the cartridge as indicated at 183 will engage fingers 181 and 182 to raise the lever to a position comparable to the position shown in solid outline at 45 in FIG. 1. In this position, the weight of the lever 176 of itself will be insufficient to overcome the biasing force of spring arm 162, so that the cartridge will be effectively urged in the loading direction 164 and maintained in operating relationship to the usual capstan and transducer heads.

In FIG. 6, a tape cartridge transducer machine 200 is illustrated which is provided with suitable guide means such as 201 and 202 and suitable detent means such as 203 and 204 defining a cartridge-receiving space. The detent rollers 203 and 204 may be mounted on spring arms 205 and 206 which in turn are secured to a shiftable frame in the form of a plate 208 by means of upstanding lugs 210′ and 211. In the position shown in FIG. 6, the cartridge 210 is locked for joint movement with the shiftable frame 208, and the shiftable frame 208 is urged in the forward cartridge-loading direction indicated by arrow 215 by means of a tension spring 216. Suitable means limiting the forward and reverse movement of the plate 208 are indicated by elongated slot 218 in plate 208 and a fixed pin 219, and it will be observed that with the cartridge 210 in operative relation to the cooperating parts of the machine such as capstan 220, the frame 208 has not reached its extreme forward position indicated in dot-dash outline at 208a, so that the biasing spring 216 is effectively biasing the cartridge into operating position. Suitable lateral guidance for the frame 208 is indicated at 221 and 222.

The cartridge 210 may be released from the operating position by cartridge ejection mechanisms corresponding to those of any of the preceding embodiments, or the cartridge may be simply manually retracted to a standby or inactive position at which inactive position the detents 203 and 204 are out of engageable relation to the notches 211 and 212.

In loading a new cartridge into the machine 200, the cartridge is inserted in the loading direction 215 until pressure roller 230 engages the capstan 220. The relative positioning under this condition is such that the detents 203 and 204 will necessarily be within their operating range relative to notches 211 and 212 so as to engage with the forward extremities of notches 211 and 212. In this condition, the springs 205 and 206 being of greater effective strength than the tension spring 216, the springs 205 and 206 will force the detents 203 and 204 inwardly into the notches 211 and 212 driving the shiftable frame 208 in the rearward direction until the detents 203 and 204 are seated at the bottom of notches 211 and 212 as illustrated in FIG. 6. In this condition, the tension of spring 216 provides an adequate cartridge-biasing force urging the cartridge to the operating position shown in FIG. 6. The arrangement will operate even when one notch, as 211, is omitted with roll 203 pressed against a straight side of the cartridge (which could then be the standard cartridge).

It will be noted that in the embodiments of FIGS. 1 and 2, FIG. 3, FIG. 5, and FIG. 6, the cartridge is manually removable from its operating position by directly pulling the cartridge rearwardly. This provision is useful for those who may not be familiar with the release mechanism. In FIG. 4, the cartridge engaging portion 145 is directly visible to the user, and its operation can be perceived tactually even in the absence of direct visual observation so as to readily permit an unfamiliar user to actuate the same for release of the cartridge.

In each of the embodiments, power-operated means is readily provided for actuating the cartridge ejection mechanism, and such power-operated means may be very conveniently controlled from any suitable remote location so as to selectively or automatically interrupt play of a give cartridge. As an alternative, the power-operated means such as solenoid 154, FIG. 4, may be actuated by the conventional means comprising conductive strip 230 on tape 13 at the end of each set of tracks which conventional means is normally utilized to shift the head assembly to the next set of tracks. In this case if it is desired to play the next set of tracks, the user may simply push the cartridge forwardly from the standby to the operating position after each interruption. Any such automatic operation may be selectively disabled as is illustrated by the switch 157, FIG. 4. An important advantage of the provision of power-operated cartridge ejection is that this feature prevents the machine from operating indefinitely if left unattended or if the volume is tuned down, or the like. It will be noted that once the solenoid 154 is operated, the tape is moved away from the bridging contacts 155, placing the system in a completely inactive mode. Preferably the solenoid 154 operates after a sufficient time delay to insure that the bridging strip 230 on the tape 13, FIG. 4 will be out of registry with contacts 155 by the time the tape has come to a stop, so that the contacts 155 will not be reclosed if the same cartridge is reinserted into operating position.

The cartridge retainer or cartridge release mechanisms of FIGS. 1–to its retaining position can be automatically operated or remotely controlled as by a solenoid, relay or motor. Even though power operation is provided the cartridge may still be released by manually operating the ejection lever, or by pulling the cartridge back manually. Play is started again by pushing the cartridge to the operating position, and this may also be done by power operated means such as a solenoid or motor if desired. For example point *z* on toggle element 102, FIG. 3, may be pulled downwardly by a solenoid to automatically move the toggle element 102 from its release position (indicated in dot-dash outline at 102*a*) to its retaining position (shown in solid outline) thereby to move the cartridge from the standby position (11*a*to the operating position.

Referring to the embodiment of FIGS. 1 and 2, friction could be reduced at the surface of the cartridge engaging portion 50 which is in sliding contact with the cartridge as the cartridge is inserted into the cartridge-receiving space and removed therefrom, for example by providing a Teflon coating on such surface or even b providing a roller at such surface which would have rolling contact with the bottom wall 19 of the cartridge.

It will be apparent that many further modifications and variations may be effected without departing from the scope of the novel concepts of the present invention.

I claim as my invention:

1. A tape cartridge transducer machine comprising
a housing having a cartridge receiving space,
a transducer head,
a driving capstan; and
having means for guiding a tape containing cartridge along a loading path in said space as the cartridge is moved to an operating position with the tape of said cartridge operatively engaging said head and capstan at the forward end of the cartridge,
said housing having means for stably supporting said cartridge in an inactive position, offset along said loading path from the operating position, in which the tape is out of operative engagement with said head and capstan,
and cartridge retention nand ejection mechanism comprising an elongated lever structure having a First and a second link pivotally connected, with a manually engageable end portion of the first link disposed adjacent the rearward end of a cartridge in the operating position, the portion of said lever adjacent thereto extending generally along the loading path of the cartridge,
said first link of said lever structure being pivotally supported on a fixed axis, extending transversely to said loading path, spaced from the cartridge receiving space and disposed intermediate respective ends of the lever structure such axis being disposed forwardly of the rearward end of a cartridge in the operating position, whereby said lever structure is pivotally movable from a rest position responsive to pressure on the manually engageable end portion of said first link directed transversely to said loading path;
spring means operatively connected to said lever structure for normally retaining the same in said rest position with one of the links of said lever structure having means movable therewith for automatically engaging a rearwardly facing wall extending substantially parallel to the forward end wall of such a cartridge when said lever structure is in its rest position to assume a cartridge-retaining condition for retaining the cartridge in the operating position, said spring means being operative through said movable means to apply forces to said cartridge, resiliently urging the latter in an inward direction whereby the tape of such a cartridge is thereby urged into firm operative engagement with said capstan,
the second link of said lever having means movable therewith for engaging a forward facing wall of a cartridge in the operating position and for moving such a cartridge from the operating position to the inactive position as said first link is pivoted about said pivot axis from said rest position to its actuated position.

2. A transducer machining according to claim 1, wherein said second link comprises a toggle element resiliently biased to assume first and second conditions, the toggle element in the first condition being arranged to engage a cartridge and urge the cartridge to the operating position, and the toggle element in the second condition thereof accommodating removal of a cartridge from the cartridge-receiving space, the toggle element automatically shifting from the second condition to the first condition as a cartridge is manually inserted into the cartridge receiving space.

3. A transducer machine according to claim 1, wherein said second link has a toggle element engageable with a cartridge in the operating position to bias the cartridge in a forward direction and operable to shift the cartridge rearwardly from the operating position to the inactive position as the toggle element is moved to a second condition, said toggle element releasing forward biasing engagement with the cartridge from the cartridge receiving space.

4. A transducer machining according to claim 1, wherein said movable means comprises a cartridge-engaging portion on said first link for retaining the cartridge in operating position and the fixed pivot point of said first link being substantially offset from the cartridge-engaging portion with respect to a direction at right angles to the loading path of the cartridge in the cartridge-receiving space such that movement of the cartridge-engaging portion about the pivot provides a substantial component of movement in a direction parallel to the loading path of the cartridge, and means biasing the lever in a direction for urging a cartridge in the operating position forwardly in a direction along the loading path.

5. A transducer machine according to claim 1, wherein said second link has an extension engageable with the cartridge and is movable substantially parallel to the cartridge-loading path in response to manual actuation of the first link to move the cartridge from the operating to the inactive position.

* * * * *